United States Patent

Kuriwada et al.

[11] Patent Number: 5,996,922
[45] Date of Patent: Dec. 7, 1999

[54] BELT-DRIVEN RECORDING TAPE CARTRIDGE AND ROLLER FOR THE SAME

[75] Inventors: Takeshi Kuriwada; Miyuki Kawasumi, both of Yokohama, Japan

[73] Assignee: Verbatim Corporation, Charlotte, N.C.

[21] Appl. No.: 09/160,592

[22] Filed: Sep. 25, 1998

[30] Foreign Application Priority Data

Sep. 26, 1997 [JP] Japan .................................. 9-261574

[51] Int. Cl.⁶ .................. G11B 23/04; G11B 23/087; G11B 23/02
[52] U.S. Cl. ................ 242/340; 242/342; 360/132
[58] Field of Search .................. 242/340, 342, 242/348, 352.4, 391.3, 541.3; 360/132

[56] References Cited

U.S. PATENT DOCUMENTS

| | | |
|---|---|---|
| 3,692,255 | 9/1972 | Von Behren .......................... 242/342 |
| 4,466,564 | 8/1984 | Smith et al. ............................ 226/170 |
| 4,581,189 | 4/1986 | Smith et al. ............................ 264/131 |
| 5,765,772 | 6/1998 | Bay et al. ............................... 242/342 |

FOREIGN PATENT DOCUMENTS 8-63936  3/1996  Japan .

Primary Examiner—John Q. Nguyen
Attorney, Agent, or Firm—Oblon, Spivak, McClelland, Maier & Neustadt, P.C.

[57] ABSTRACT

A tape cartridge including a base plate, first and second tape reels, a magnetic recording tape, a driving belt, and a roller. The magnetic recording tape winds around the first and second tape reels. The driving belt moves the magnetic recording tape. The roller is provided on the base plate rotatably around an axis of the roller and guides the driving belt. The roller includes an end surface slidable on the base plate. The end surface includes at least one groove and at least one sliding surface which contacts the base plate. The at least one sliding surface has a width of at least 0.1 mm along a radial direction of the roller.

26 Claims, 9 Drawing Sheets

BELT-DRIVEN RECORDING TAPE CARTRIDGE AND ROLLER FOR THE SAME

CROSS-REFERENCE TO RELATED APPLICATIONS

The present application claims priority under 35 U.S.C. §119 to Japanese Patent Application No. 9-261,574, filed Sep. 26, 1997, entitled "Belt Driven Recording Tape Cartridge." The contents of that application are incorporated herein by reference in their entirety.

BACKGROUND OF THE INVENTION

1. Field of the Invention

The present invention relates to a belt-driven recording tape cartridge and a roller therefor.

2. Description of the Related Art

Belt-driven recording tape cartridges are widely used because of their convenience and large storage capacities. They are used in, for example, computers in order to record and retrieve data.

Belt-driven recording tape cartridges are disclosed in U.S. Pat. No. 3,692,255 (hereinafter referred to as the "'255 patent"), entitled "Belt Driven Tape Cartridge"; U.S. Pat. No. 4,466,564 (hereinafter referred to as the "'564 patent"), entitled "Belt For Belt-Driven Recording Tape Pack"; U.S. Pat. No. 4,581,189 (hereinafter referred to as the "'189 patent"), entitled "Method Of Making A Belt For Belt-Driven Recording Tape Pack"; and Japanese Unexamined Patent Publication (Kokai) 8-63,936 (hereinafter referred to as the "'936 publication"), entitled "Tape Cartridge." The contents of these applications are incorporated herein by reference in their entirety.

In the tape cartridges disclosed in the '255 patent, the '564 patent, and the '189 patent, a tape cartridge has first and second tape reels. Each of the first and second tape reels is rotatable around respective axis. A magnetic recording tape is wound around the first and second tape reels to form first and second tape packs. A driving belt is in contact with the magnetic recording tape at both the first and second tape packs. Accordingly, the driving belt moves the recording tape through friction between the driving belt and the recording tape.

In this tape cartridge, stabilizing contact between the magnetic recording tape and the magnetic head of a drive improves the reliability of the tape cartridge.

In the tape cartridge disclosed in the '936 publication, a base plate and a cover surround first and second tape reels, a magnetic recording tape, a driving belt and rollers which guide the driving belt. Rough surfaces are formed at portions of the cover and/or the base plate which contact roller end surfaces which are perpendicular to axes of the rollers. The rough surfaces include many concave and convex portions. Accordingly, in this tape cartridge, a lubricant is retained in the concave portions. However, a problem arises in that a torque for rotating the roller is not stabilized, because the convex portions break the thin layer of the lubricant formed on the cover and/or the base plate. Therefore, the tape tension of the magnetic recording tape cannot be stabilized.

SUMMARY OF THE INVENTION

A first object of the present invention is to provide a belt-driven recording tape cartridge which has an improved reliability. A second object of the present invention is to provide a roller which stabilizes a driving torque used to rotate the roller of a recording tape cartridge.

The first object is achieved according to the present invention by providing a new belt-driven recording tape cartridge including a base plate, first and second tape reels, a magnetic recording tape, a driving belt, and a roller. The magnetic recording tape winds around the first and second tape reels. The driving belt moves the magnetic recording tape. The roller is provided on the base plate rotatably around an axis of the roller and guides the driving belt. An end surface of the roller is slidable on the base plate. The end surface includes at least one groove and at least one sliding surface for contacting the base plate. The at least one sliding surface has a width of at least 0.1 mm along a radial direction of the roller.

The second object is achieved according to the present invention by providing a new roller for use in the recording tape cartridge. The roller is provided on a base plate rotatably around an axis of the roller and guides a driving belt. The roller includes an end surface, slidable on the base plate, with at least one groove and at least one sliding surface. The at least one sliding surface for contacting the base plate has a width of at least 0.1 mm along a radial direction of the roller.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE PREFERRED EMBODIMENTS

Figure 1:
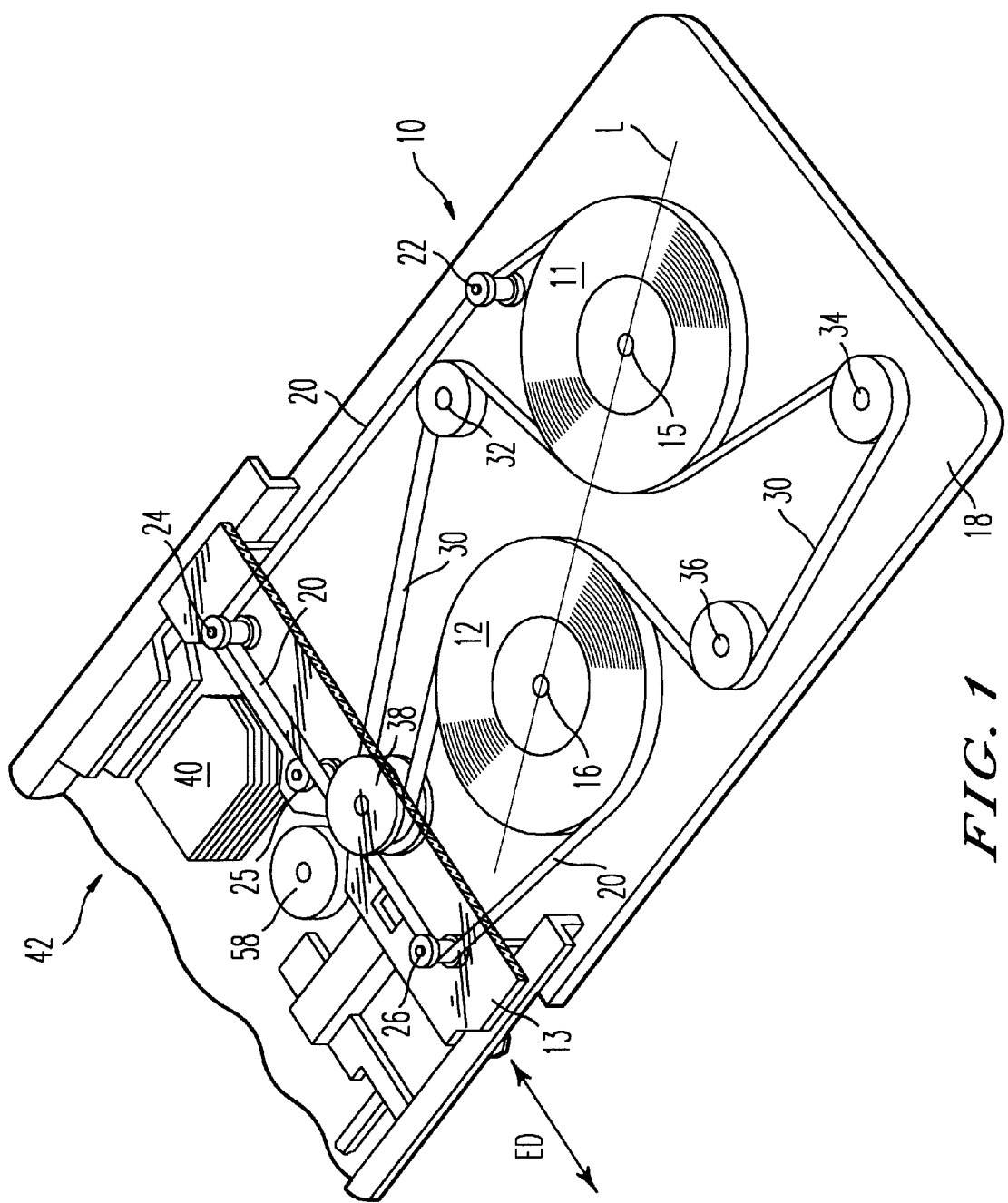
FIG. 1 is a perspective view showing the internal structure of a belt-driven recording tape cartridge according to a first embodiment of the present invention.

The preferred embodiments will now be described with reference to the accompanying drawings, wherein like reference numerals designate corresponding or identical elements throughout the various drawings.

FIG. 1 shows a perspective view of an internal structure of a belt-driven recording tape cartridge according to a first embodiment of the present invention. Referring to FIG. 1, the cartridge 10 has a first tape reel 15 and a second tape reel 16 which are arranged between a base plate 18 and a transparent plastic cover 13 (only partially shown). In the first embodiment, the base plate 18 is made from a thermally-efficient heat-conductive plate, for example, metal. Each of the first and second tape reels (15 and 16) has a respective axis around which it rotates. Each of the first and second tape reels (15 and 16) is pressed against the base plate 18 by a respective leaf spring (not shown) arranged between the plastic cover 13 and the respective tape reels (15 or 16). Accordingly, the first and second tape reels (15 and 16) are in contact with the base plate 18 while rotating, and thus do not vibrate in the direction along the respective axes of the first and second tape reels (15 and 16). One end of a magnetic recording tape 20 is connected to the first tape reel 15, and the other end of the magnetic recording tape 20 is connected to the second tape reel 16. The magnetic recording tape 20 winds around the first and second tape reels (15 and 16) to form first and second tape packs (11 and 12). The magnetic recording tape 20 is guided by tape guide pins (22, 24, 25, and 26) which are provided on the base plate 18. The magnetic recording tape 20 extends along an extending direction (ED) at a front portion of the tape cartridge 10 between the tape guide pins (24 and 26). A magnetic head 40 of a drive 42 is adapted to be introduced into the front portion of the tape cartridge 10. Accordingly, a portion of the magnetic recording tape 20 between the tape guide pins (24 and 26) contacts the magnetic head 40. The first and second tape reels (15 and 16) are arranged such that a line (L) connecting the axes of the first and second tape reels (15 and 16) is perpendicular to or oblique to the extending direction (ED). Accordingly, in the first embodiment, the recording capacity of the recording tape cartridge 10 can be increased.

A driving belt 30 is engaged with a driving roller 38, an idler roller 32, and corner rollers (34 and 36). These rollers (38, 32, 34 and 36) are made from a material which has a high abrasion resistance, for example, polyacetals. The driving belt 30 contacts the first tape pack 11 between the idler roller 32 and the corner roller 34, and the second tape pack 12 between the corner roller 36 and the driving roller 38. Accordingly, when moving, the driving belt 30 drives the recording tape 20 by the friction. The driving belt 30 is driven by the driving roller 38 which is driven by a capstan 58. Accordingly, the recording tape 20 is wound or rewound by the driving belt 30. The driving roller 38 is pressed against the base plate 18 by the capstan 58 to be in contact with the base plate 18. Accordingly, as long as the driving roller 38 contacts the base plate 18, the rollers (32, 34 and 36) which are rotated by the driving roller 38 via the driving belt 30 contact the base plate 18 while rotating. Above described structures are contained between the base plate 18 and the cover 13.

Figure 2:
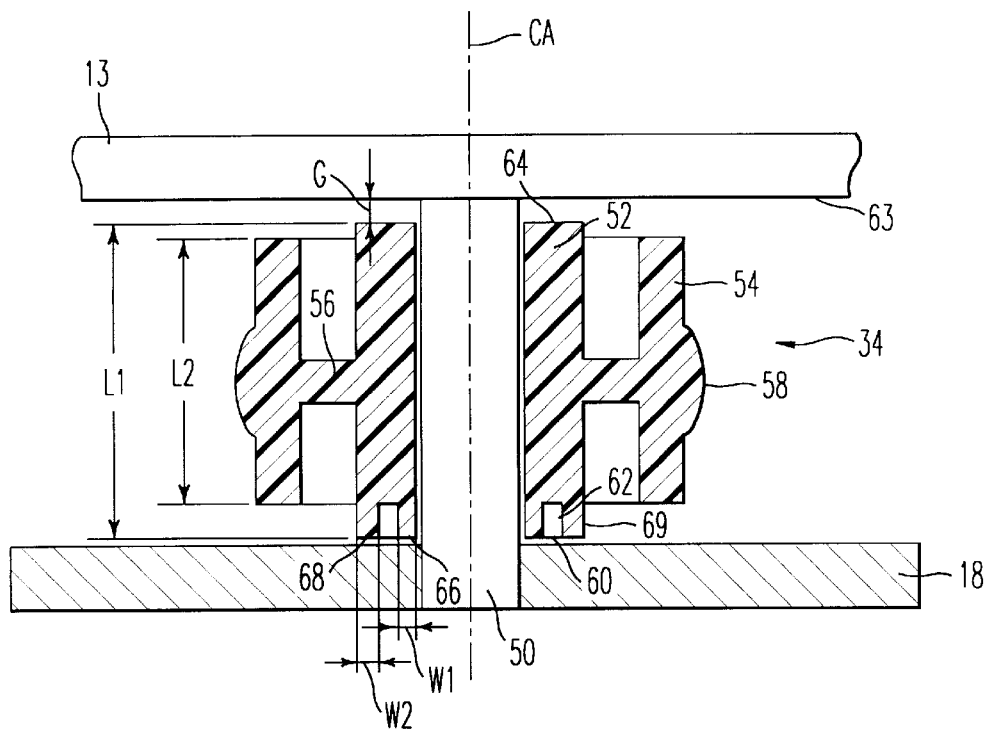
FIG. 2 is a cross-sectional view of a roller of the belt-driven recording tape cartridge shown in FIG. 1.

FIG. 2 illustrates a cross-sectional view of the corner roller 34. The structure of the other corner roller 36 is similar to that of the corner roller 34. Further, in one embodiment, the structures of the other rollers (32 and 38) are similar to that of the corner roller 34. Referring to FIG. 2, a shaft 50 is perpendicularly fixed to the base plate 18. Further, in one embodiment, the shaft 50 may be integrally formed as a part of the base plate 18. The corner roller 34 rotates around the shaft 50 on the base plate 18. Grease is provided between the corner roller 34 and the shaft 50, and between the corner roller 34 and the base plate 18. Similarly, the first and second tape reels (15 and 16), the driving roller 38, the idler roller 32 and the corner roller 36 (see FIG. 1) are provided with grease.

The corner roller 34 has an inner cylindrical portion 52 and an outer cylindrical portion 54 which extend along a center axis CA of the corner roller 34. The length L1 of the inner cylindrical portion 52 along the center axis CA is longer than the length L2 of the outer cylindrical portion 54 along the center axis CA. The inner and outer cylindrical portions (52 and 54) are connected at a center portion along the center axis CA by a connecting portion 56 which extends along a radial direction of the corner roller 34. The outer cylindrical portion 54 has a convex portion 58 on the outer circumferential surface of the outer cylindrical portion 54 at the center portion along the center axis CA. The driving belt 30 is wound around the convex portion 58. The inner cylindrical portion 52 has a bottom end surface 60 which is in contact with the upper surface of the base plate 18. Accordingly, the bottom end surface 60 of the corner roller 34 slides on the upper surface of the base plate 18 when the corner roller 34 rotates. The inner cylindrical portion 52 also has a top end surface 64. There is a gap G of about 0.5 mm between the top end surface 64 and the lower surface 63 of the cover 13. Accordingly, the corner roller 34 is not in contact with the cover 13.

The corner roller 34 is made from a material which has a high abrasion resistance, for example, polyacetals. The polyacetals show a better abrasion resistance against metal than against a resin. Since metal has a high heat conductivity, the heat generated by the friction between the roller and the metal can be easily radiated through the metal. On the other hand, the heat generated by the friction between the roller and a resin cannot easily be radiated through the resin. Accordingly, the heat which is accumulated in the friction portion accelerates the abrasion of the roller, and thus the driving torque to rotate the roller is not stabilized. Accordingly, in the first embodiment of the present invention, the base plate 18 is made from a thermally-efficient heat-conductive material, for example, metal. However, in the other embodiment according to the present invention, the base plate 18 may be made from plastic. Because, as described below, according to the embodiments of the present invention, stabilization of the driving torque is improved.

Friction between the bottom end surface 60 of the corner roller and the base plate 18 was researched in relation to the effect on tape tension. First, the driving torque T1 (no-load torque) to rotate the corner roller was measured when (1)synthetic oil grease was provided between the shaft 50 and the corner roller and (2) the corner roller was floated on the base plate 18. The measured no-load torque T1 was 14.5 gf.cm. Then, the driving torque T2 (load torque) to rotate the corner roller was measured when (1) synthetic oil grease was provided between (a1) the shaft 50 and (a2) the corner roller and between (b1) the base plate 18 and (b2) the bottom end surface 60 of the corner roller and (2) the corner roller was in contact with the base plate 18 via the grease. The measured load torque T2 was 18.5 gf.cm. According to this experiment, it was found that a driving torque of 4 gf.cm results from the friction between the base plate 18 and the bottom end surface 60 of the corner roller. Specifically, as a result of the friction state between the base plate 18 and the bottom end surface 60 of the corner roller, the driving torque to rotate the corner roller may change from 14.5 gf.cm to 18.5 gf.cm.

Accordingly, according to the first embodiment of the present invention, first and second sliding surfaces (66 and 68) and an annular groove 62 for retaining grease are provided on the bottom end surface 60. The first and second sliding surfaces (66 and 68) are in contact with the surface of the base plate 18. The first and second sliding surfaces (66 and 68) have widths (W1 and W2) which are at least 0.1 mm along the radial direction of the inner cylindrical portion 52. Preferably, the first and second sliding surfaces (66 and 68) have widths (W1 and W2) which are at least 0.2 mm along the radial direction of the inner cylindrical portion 52. The width W1 may or may not be the same as the width W2. The groove 62 extends along a circumferential direction of the inner cylindrical portion 52. The groove 62 do not extend thorough to the outer circumferential surface 69 of the inner cylindrical portion to prevent the grease inside the groove 62 from flowing through the groove 62 by a centrifugal force. The groove 62 is positioned at the substantial center of the inner cylindrical portion 52 along a radial direction of the inner cylindrical portion 52. The groove 62 has a width and depth sufficient to retain enough grease in the groove 62. Preferably, the groove has a width of approximately 0.1 mm to 0.5 mm and a depth of at least 0.3 mm. The first and second sliding surfaces 66 and 68 have a smooth flat surface and a surface roughness Ra of at most 1 µm. Preferably, the surface roughness Ra is at most 0.5 µm.

According to the first embodiment of the present invention, the first and second sliding surfaces having widths (W1 and W2) can slide on the thin lubricant layer formed on the surface of the base plate 18 without breaking the thin lubricant layer. Further, the supply of the grease from the groove 62 to the gap between the sliding surfaces of the corner roller 34 and the base plate 18 can continue over an extended period of time. Accordingly, since the driving torque to rotate the corner roller 34 is stabilized during that time, the tape tension is stabilized. Therefore, a stable contact between the magnetic recording tape and the magnetic head of a drive is maintained. Thus, the reliability of the tape cartridge is improved.

The present invention will be further described in the following examples, but the present invention is not limited thereto. The following examples were evaluated according to the following methods.

(1) Measurement of Driving Torque

Figure 3:
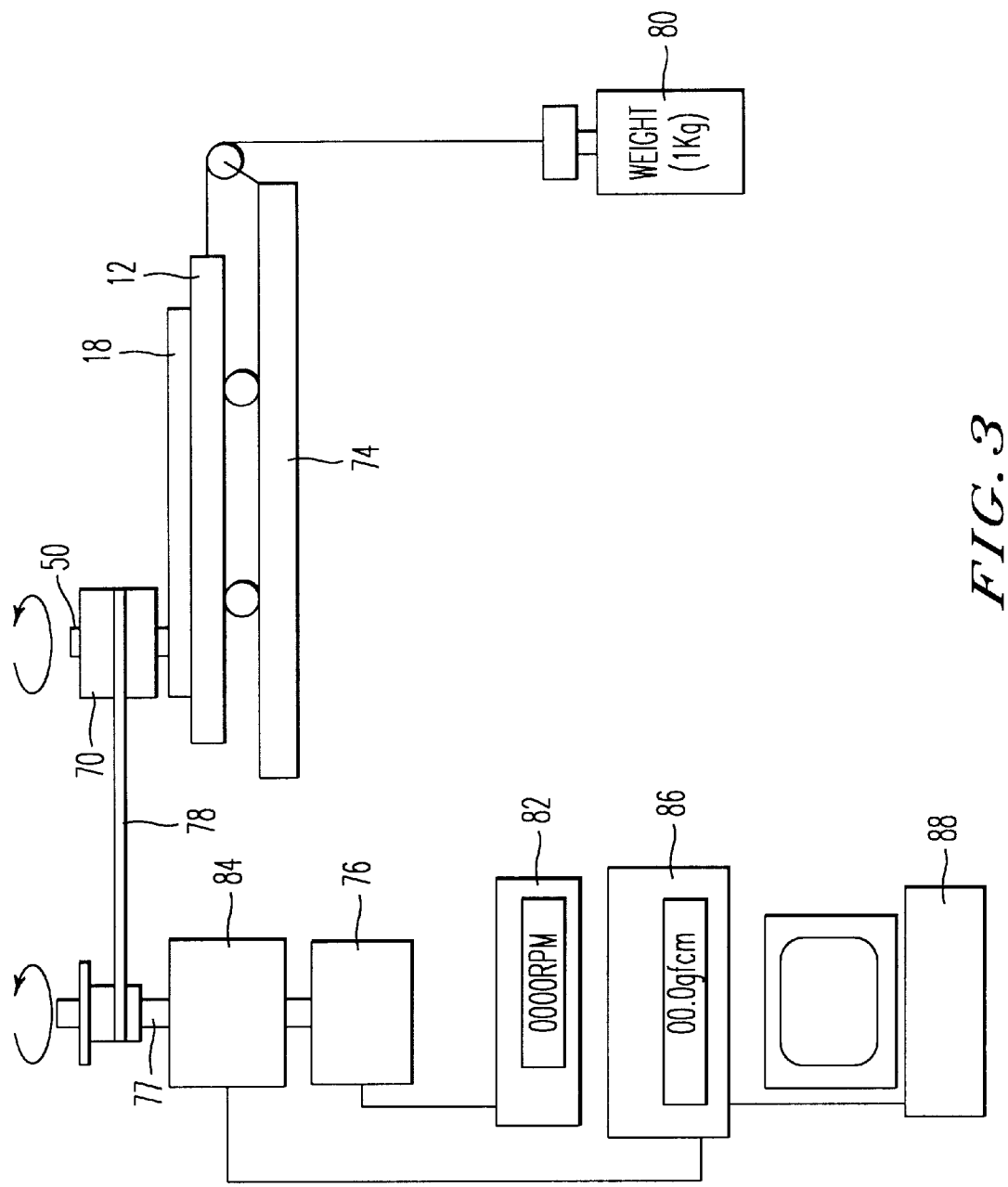
FIG. 3 is an apparatus for measuring the driving torque used to rotate the roller.

FIG. 3 illustrates an apparatus by which the driving torque to rotate the roller was measured. Referring to FIG. 3, the shaft 50 is fixed to the base plate 18. The sample roller 70 is provided on the base plate 18 to be rotatable around the shaft 50. The base plate 18 is fixed to a cart 72 which is movable on a table 74. A motor 76 is adapted to rotate the sample roller 70 via a motor shaft 77 and a belt 78. The sample roller 70 is pulled by a weight 80 of 1 kg to produce tension on the belt 78. The motor speed of the motor 76 is controlled by a motor controller 82. The output torque of the motor 76 is detected by a torque detector 84 and indicated by a torque indicator 86. The output torque of the motor 76 is used as the driving torque to rotate the sample roller 70. The detected data are continuously recorded in a personal computer 88, such as the "NR-250" manufactured by Keyence.

In the apparatus in FIG. 3, the magnetic phase difference type detector "MD-202R" manufactured by Ono Sottsuki Co. was used as the torque detector 84. The "TS-3600A" manufactured by Ono Sottsuki Co. was used As the torque indicator 86.

(2) Surface Roughness Ra of the Sliding Surface

According to JIS (Japanese Industrial Standard) B0601-1994, the surface roughness of 1 µm or more was measured by a contact-type surface roughness measuring instrument manufactured by Tokyo Seimitsu Co. under the conditions that the radius of the probe tip was 0.05 µm, the load was 30 mg, and the cut-off value was 0.08 mm. The surface roughness of less than 1 µm was measured by a optical-type surface roughness measuring instrument "ZYGO 'New view 100'" manufactured by ZYGO having a Mirau lens of 40 magnifications without a filter.

EXAMPLE 1

The inner cylindrical portion 52 of the roller had an inner diameter of 3.475 mm and outer diameter of 5.9 mm. The sliding surfaces had a surface roughness Ra of 0.3 µm. The annular groove 62 was formed on the bottom surface 60 to extend along the circumferential direction of the inner cylindrical portion 52. The shaft 50 had a diameter of 3.447 mm. Grease of 0.004 cm$^3$, which was made from synthetic oil and PTFE as a thickener, was provided between the shaft 50 and the roller 34.

The driving torque to rotate the roller 34 was measured by the apparatus shown in FIG. 3 while roller 34 was rotated under the following conditions.

The temperature of the base plate 18 was controlled at 23° C. The sample roller was rotated for 20 minutes. The driving torque was measured while the sample roller rotated. Then, the temperature of the base plate 18 was raised to 45° C. and retained at that temperature for 5 minutes. Then, the temperature of the base plate 18 was returned to 23° C. The change of the driving torque was detected.

Figure 4:
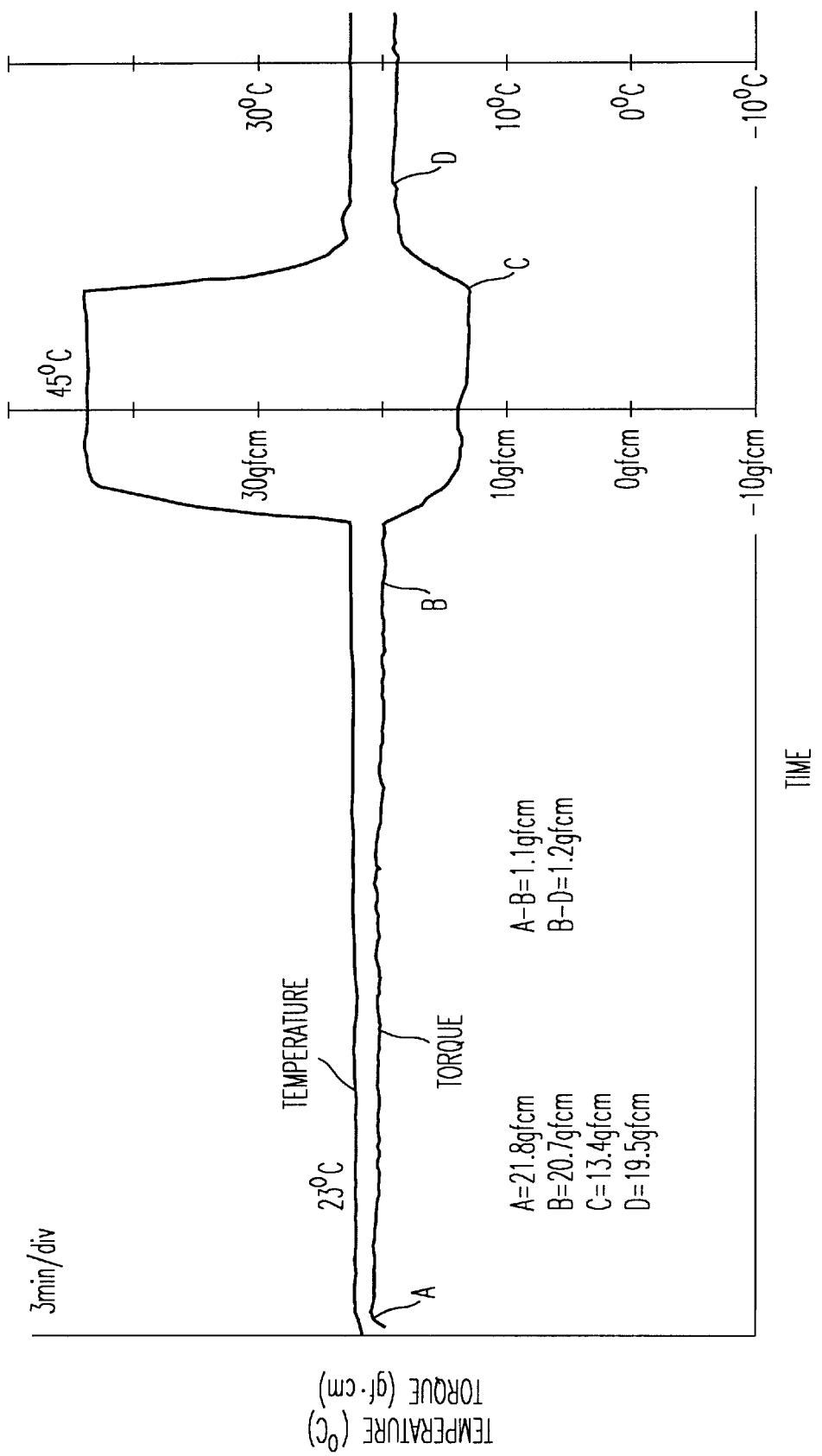
FIG. 4 is a graph showing changes in the driving torque and in the temperature of the base plate in Example 1.

FIG. 4 illustrates the test result. Referring to FIG. 4, the driving torque to rotate the roller 34 was stable from the start point A. After the temperature was returned from 45° C. to 23° C., the torque was returned to the original torque at 23° C.

Comparative Example 1

The sliding surfaces were roughed by a No. 600 emery paper. The sliding surfaces had a surface roughness Ra of 2.0 µm. Other factors were the same as those of Example 1. The driving torque was measured according to the same method as that in Example 1.

Figure 5:
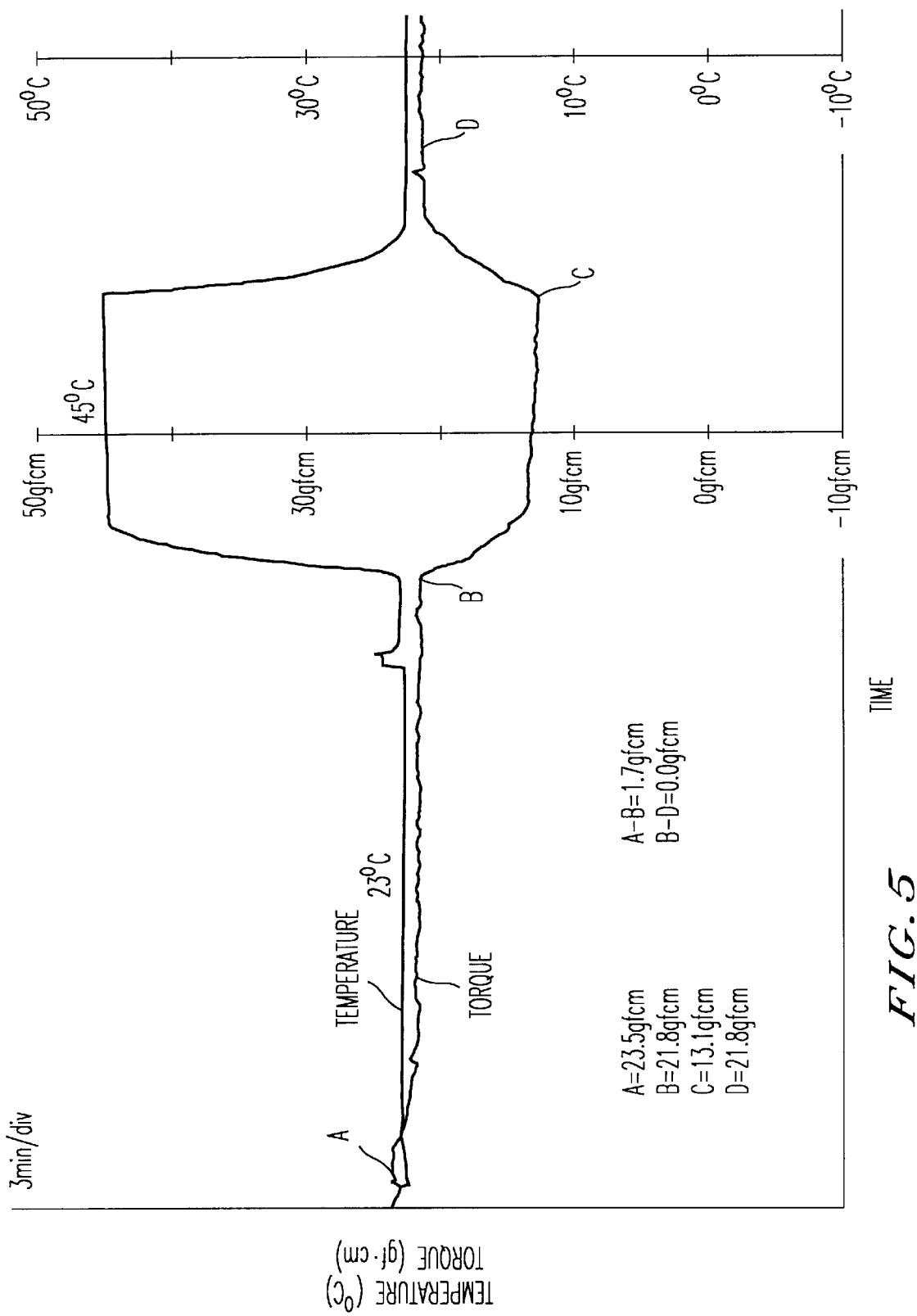
FIG. 5 is a graph showing the changes in the driving torque and in the temperature of the base plate in Comparative Example 1.

FIG. 5 illustrates the test result. Referring to FIG. 5, the torque reduces for about 3 minutes after being rotated. After the temperature was returned from 45° C. to 23° C., the torque was returned to the original torque at 23° C. The reason is that the groove 62 retained enough grease therein. However, due to the surface roughness of the bottom surface 60, the roller needed some time before the torque became stable after being rotated.

Comparative Example 2

The groove 62 was not formed on the bottom surface 60. Other factors were the same as those of Comparative Example 1. The torque was measured according to the same method as that in Example 1.

Figure 6:
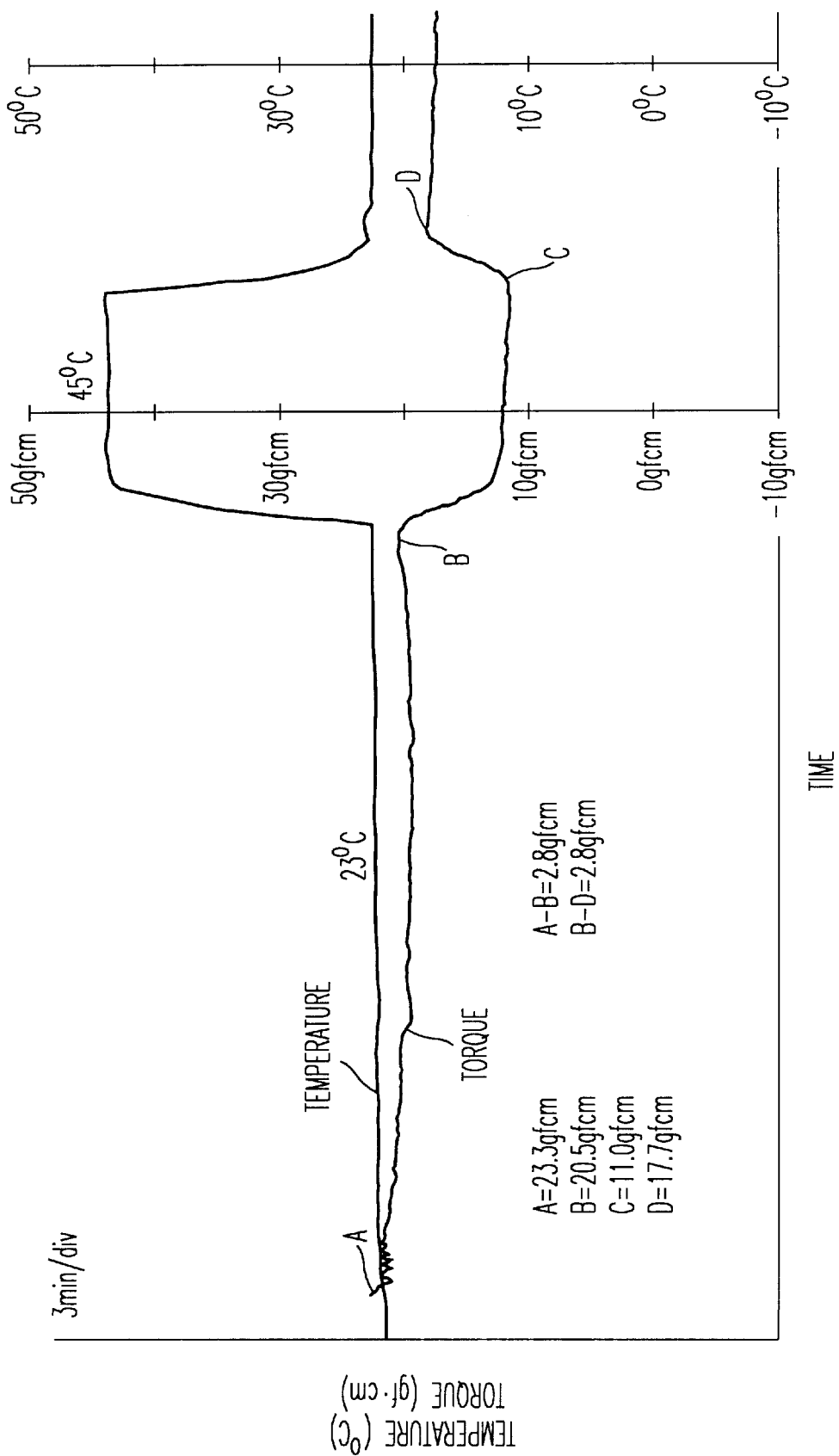
FIG. 6 is a graph showing the changes in the driving torque and in the temperature of the base plate in Comparative Example 2.

FIG. 6 illustrates the test result. Referring to FIG. 6, the torque was unstable for about 20 minutes after starting. After the temperature was returned from 45° C. to 23° C., the torque was not returned to the original torque before the temperature was increased to 45° C. When the sliding surfaces have a surface roughness Ra of around 2.0 µm, the roller breaks the lubricant layer while rotating. Accordingly, the torque becomes unstable. Further, since such a degree of surface roughness is not enough to retain grease therein, the torque was not returned to the original torque even though the temperature was reduced from 45° C. to 23° C.

Comparative Example 3

The groove 62 was not formed on the bottom surface 60. Other factors were the same as those of Example 1. The torque was measured according to the same method as that in Example 1.

Figure 7:
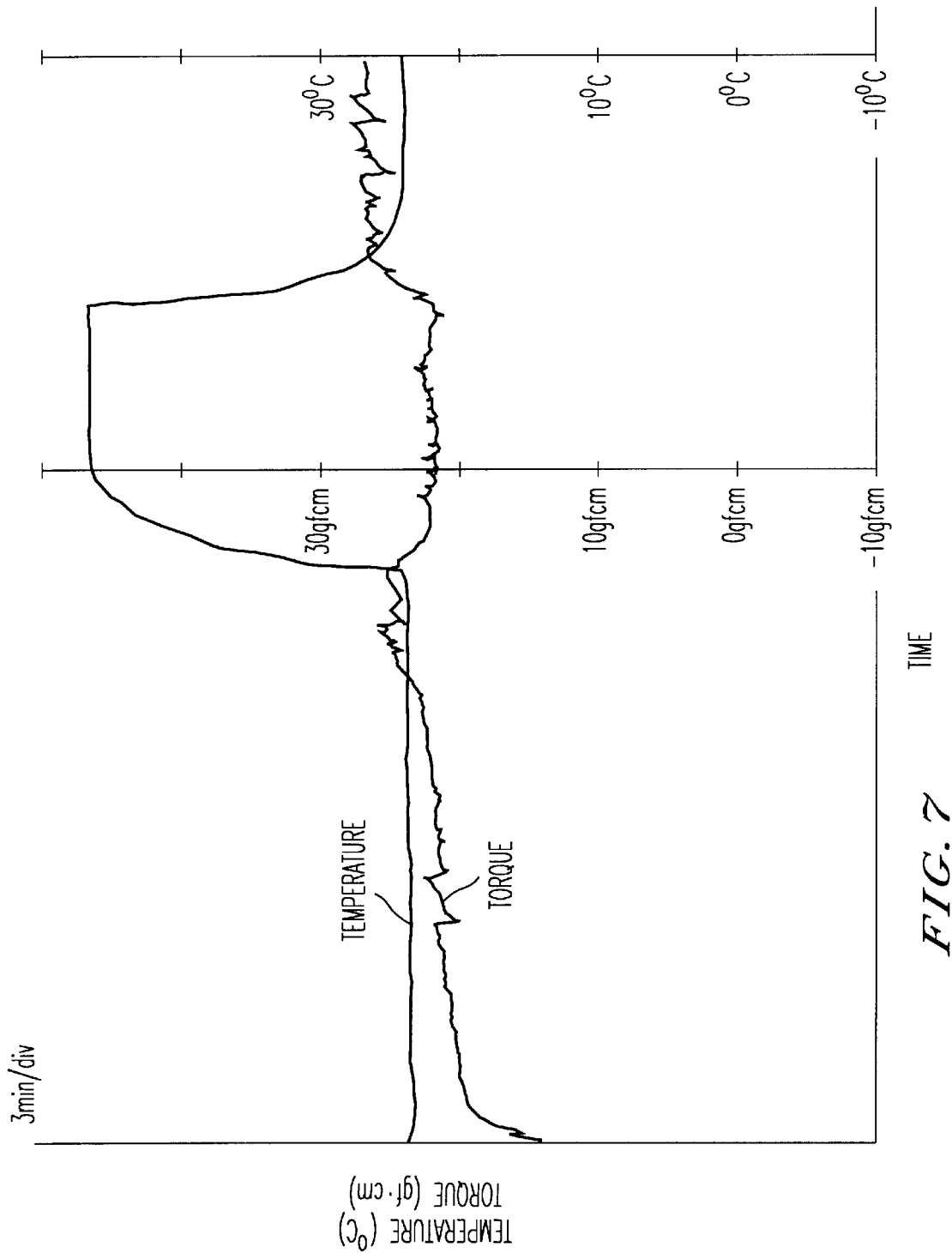
FIG. 7 is a graph showing the changes in the driving torque and in the temperature of the base plate in Comparative Example 3.

FIG. 7 illustrates the test result. The bottom surface 60 which has a relatively smooth surface without the groove does not function to retain the grease. Accordingly, since there was insufficient grease between the bottom surface and the base plate immediately after the rotation of the roller was started, the torque increased.

According to the first embodiment of the present invention, the tape tension is stabilized since the driving torque to rotate the roller is stabilized for a long period of time. Further, even though the temperature of the grease increases, the torque returns to the original torque when the temperature returns to the original temperature. Therefore, a stable contact between the magnetic recording tape and the magnetic head of a drive is maintained for an extended period of time. Thus, the reliability of the tape cartridge is improved.

Figure 8:
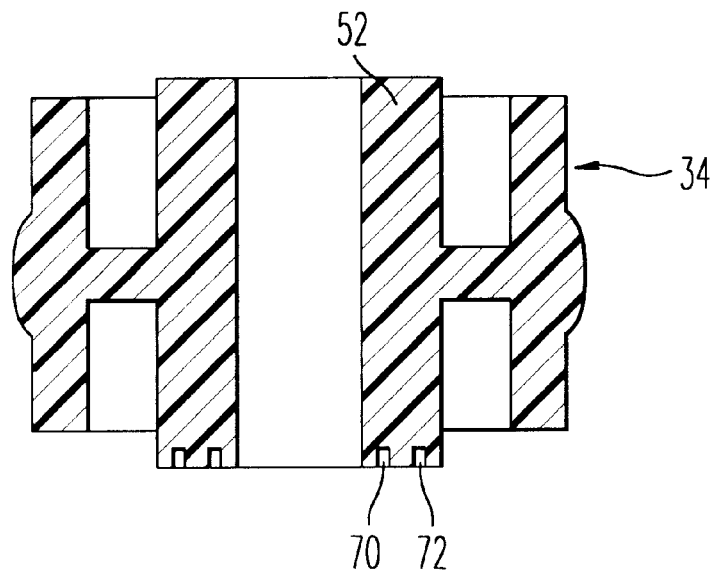
FIG. 8 is a cross-sectional view of a roller of a belt-driven recording tape cartridge according to a second embodiment of the present invention.

In the first embodiment according to the present invention, although single annular groove is formed on the bottom surface 60, in a second embodiment according to the present invention, plural annular grooves 70 and 72 is formed as shown FIG. 8. However, preferably, the number of annular grooves is at most 3.

Figure 9:
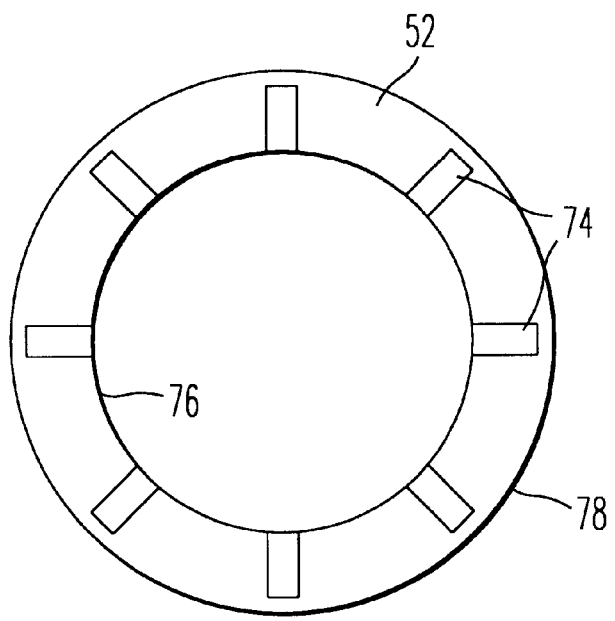
FIG. 9 is a schematic bottom plan view of an inner cylindrical portion of a roller of a belt-driven recording tape cartridge according to a third embodiment of the present invention.

Further, although in the first embodiment according to the present invention the annular groove 62 extends along the circumferential direction of the inner cylindrical portion 52, in a third embodiment according to the present invention the grooves 74 are formed to extend along a radial direction of the inner cylindrical portion 52 as shown in FIG. 9. In the third embodiment, although the grooves 74 open toward an inner circumferential surface 76 of the inner cylindrical portion 52, the grooves 74 do not extend thorough to the outer circumferential surface 78 of the inner cylindrical portion 52. The grooves 74 do not extend through to the outer circumferential surface 78 to prevent the grease inside the grooves 74 from flowing through the grooves 74 by a centrifugal force.

Figure 10:
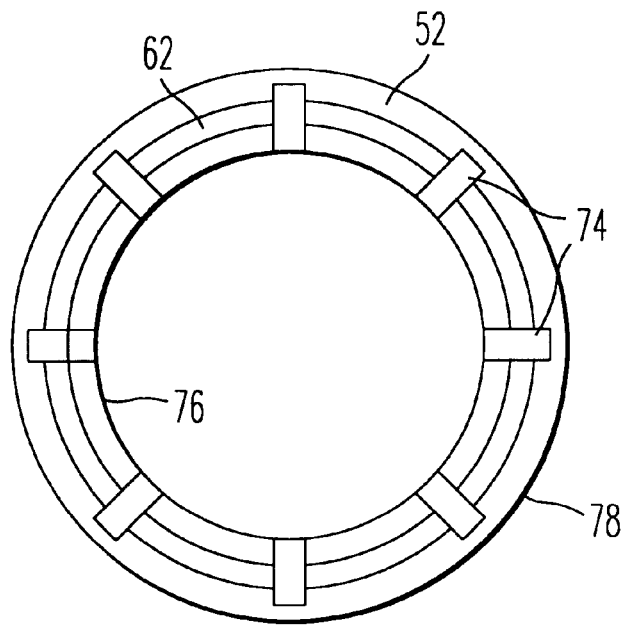
FIG. 10 is a schematic bottom plan view of an inner cylindrical portion of a roller of a belt-driven recording tape cartridge according to a fourth embodiment of the present invention.

Furthermore, in the fourth embodiment, both of the annular groove 62 and the circumferential grooves 74 are used, for example, as shown in FIG. 10.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A tape cartridge comprising:
    a base plate;
    first and second tape reels provided on the base plate;
    a magnetic recording tape winding around said first and second tape reels;
    a driving belt for moving said magnetic recording tape; and
    a roller provided on said base plate rotatably around an axis of the roller and for guiding said driving belt, said roller including an axial end surface slidable on said base plate, said end surface including at least one groove and at least one sliding surface contacting the base plate, said at least one sliding surface having a width of at least 0.1 mm along a radial direction of said roller.

2. A tape cartridge according to claim 1, wherein said driving belt moves said magnetic recording tape through friction between said driving belt and said magnetic recording tape.

3. A tape cartridge according to claim 1, wherein said base plate comprises a thermally-efficient heat-conductive plate.

4. A tape cartridge according to claim 3, wherein said base plate is made from metal.

5. A tape cartridge according to claim 1, wherein said base plate is made from plastic.

6. A tape cartridge according to claim 1, wherein said at least one sliding surface having a width of at least 0.2 mm along a radial direction of said roller.

7. A tape cartridge according to claim 1, wherein said at least one groove comprises an annular groove extending along a circumferential direction of said roller.

8. A tape cartridge according to claim 7, wherein said at least one groove comprises at most 3 grooves.

9. A tape cartridge according to claim 1, wherein said at least one groove comprises a radial groove extending along a radial direction of said roller.

10. A tape cartridge according to claim 1, wherein said at least one groove comprises a groove that does not extend to an outer circumferential surface of said roller.

11. A tape cartridge according to claim 1, wherein said at least one groove comprises an annular groove portion extending along an circumferential direction of said roller and a radial groove portion extending along a radial direction of said roller.

12. A tape cartridge according to claim 1, wherein said at least one sliding surface has a surface roughness Ra of at most 1 $\mu$m.

13. A tape cartridge according to claim 1, wherein said at least one groove has a width of 0.1 mm to 0.5 mm.

14. A tape cartridge according to claim 1, wherein said at least one groove has a depth of at least 0.3 mm.

15. A tape cartridge according to claim 1, wherein said at least one sliding surface comprises a flat surface.

16. A roller for a tape cartridge including a base plate, a magnetic recording tape, and a driving belt for moving the magnetic recording tape, the roller being provided on the base plate rotatably around an axis of the roller and guiding the driving belt, the roller comprising:
    an axial end surface slidable on the base plate;
    at least one groove being provided on said end surface; and
    at least one sliding surface formed on said end surface and contacting the base plate, said at least one sliding surface having a width of at least 0.1 mm along a radial direction of the roller.

17. A roller according to claim 16, wherein said at least one sliding surface having a width of at least 0.2 mm along a radial direction of said roller.

18. A roller according to claim 16, wherein said at least one groove comprises an annular groove extending along a circumferential direction of said roller.

19. A roller according to claim 18, wherein said at least one groove comprises at most 3 grooves.

20. A roller according to claim 16, wherein said at least one groove comprises a radial groove extending along a radial direction of said roller.

21. A roller according to claim 16, wherein said at least one groove comprises a groove that does not extend to an outer circumferential surface of said roller.

22. A roller according to claim 16, wherein said at least one groove comprises an annular groove portion extending along an circumferential direction of said roller and a radial groove portion extending along a radial direction of said roller.

23. A roller according to claim 16, wherein said at least one sliding surface has a surface roughness Ra of at most 1 $\mu$m.

24. A roller according to claim 16, wherein said at least one groove has a width of 0.1 mm to 0.5 mm.

25. A roller according to claim 16, wherein said at least one groove has a depth of at least 0.3 mm.

26. A roller according to claim 16, wherein said at least one sliding surface comprises a flat surface.

* * * * *